United States Patent [19]
Paul et al.

[11] Patent Number: 5,730,031
[45] Date of Patent: Mar. 24, 1998

[54] STRUCTURE GUIDANCE AND DRIVE ASSEMBLY FOR TRANSLATION OF A ROBOTIC PICKER ASSEMBLY

[75] Inventors: D. Scott Paul, Ft. Collins; Leslie Christie, Jr., Greeley, both of Colo.

[73] Assignee: Hewlett-Packard Company, Palo Alto, Calif.

[21] Appl. No.: 296,069

[22] Filed: Aug. 24, 1994

[51] Int. Cl.[6] .................................... G05G 11/00
[52] U.S. Cl. .................. 74/490.07; 74/479; 74/471 XY; 369/178; 248/657
[58] Field of Search ............... 74/479, 490.07, 74/471 XY; 369/178; 248/657, 651, 429

[56] References Cited

U.S. PATENT DOCUMENTS

| | | | |
|---|---|---|---|
| 4,409,860 | 10/1983 | Moriyama et al. | 74/479 |
| 4,944,082 | 7/1990 | Jones et al. | |
| 4,998,232 | 3/1991 | Methalie et al. | |
| 5,010,536 | 4/1991 | Wanger et al. | |
| 5,014,255 | 5/1991 | Wanger et al. | |
| 5,043,962 | 8/1991 | Wanger et al. | |
| 5,062,093 | 10/1991 | Christie et al. | |
| 5,065,379 | 11/1991 | Smith et al. | 369/36 |
| 5,101,387 | 3/1992 | Wanger et al. | |
| 5,184,336 | 2/1993 | Wanger et al. | |
| 5,596,556 | 1/1997 | Luffel et al. | 369/36 |

FOREIGN PATENT DOCUMENTS

| | | | |
|---|---|---|---|
| 0285866 | 12/1988 | European Pat. Off. | 17/22 |
| 2267384 | 1/1993 | United Kingdom | 17/30 |

*Primary Examiner*—Charles A. Marmor
*Assistant Examiner*—David M. Fenstermacher

[57] ABSTRACT

A structure, guidance, and drive assembly for translation of a robotic picker assembly may comprise a support frame having a front end, a rear end, and two opposed sides. The front and rear ends of the support frame are positioned in parallel, spaced-apart relation to a lateral axis, while the two opposed sides are positioned in parallel, spaced-apart relation to a longitudinal axis, the lateral and longitudinal axes defining a horizontal reference plane. The support frame includes a first elongate bearing surface that is located at about the front end of the support frame. The first elongate bearing surface extends between the two opposed sides of the support frame so that the first elongate bearing surface extends in a direction that is substantially parallel to the lateral axis and lies in a first bearing plane that is substantially parallel to the horizontal reference plane. The support frame also includes a second elongate bearing surface that is located at about the rear end of the support frame. The second elongate bearing surface also extends between the two opposed sides of the support frame and also extends in a direction that is substantially parallel to the lateral axis and lies in a second bearing plane that is substantially parallel to the horizontal reference plane. The second bearing surface plane is non-coplanar with the first bearing surface plane. A three point contact primary bearing system mounted to the robotic picker assembly is adapted to engage the first and second elongate bearing surfaces and allows the robotic picker assembly to be displaced within the support frame in a direction generally parallel to the lateral axis and along the horizontal reference plane. An actuator connected to the robotic picker assembly moves the robotic picker assembly to predetermined points along the lateral axis in response to commands from a control system.

15 Claims, 5 Drawing Sheets

STRUCTURE GUIDANCE AND DRIVE ASSEMBLY FOR TRANSLATION OF A ROBOTIC PICKER ASSEMBLY

BACKGROUND

The present invention relates generally to systems for handling and storing media cartridges such as optical disk or tape cartridges and, more particularly, to apparatus for moving a cartridge picker assembly to a predetermined cartridge engagement location.

An optical disk is a data storage medium which is readable by a laser-based reading device. Optical disks known as "compact disks" or "CDs" have become increasingly popular during the last decade for recording music and audio-visual works. Due to the large storage capacity of optical disks as compared to conventional magnetic storage media, optical disks known as "ROM disks" have become popular for storing computer readable information. However, until very recently, optical disks were of somewhat limited use in the computer industry due to the fact that optical disks could not be erased and written with new information, i.e., ROM disks are "read only" memory devices. However, recent technology has produced optical disks which are both computer readable and computer writable. Consequently, optical disks are becoming increasingly important in the computer industry and may eventually replace magnetically readable and writable storage media such as floppy disks and hard disks. Another recent development, the ability to provide data storage on both surfaces on an optical disk, has effectively doubled the storage capacity of the optical disk. Optical disks of the type used in computer applications are generally mounted in parallelepiped-shaped cartridges. Also used in the computer industry for data storage are parallelepiped-shaped tape cartridges such as Digital Audio Tape (DAT) cartridges and 8 mm tape cartridges.

The increasing popularity of such data storage cartridges in the computer field has spurred the development of many different types of automated cartridge handling systems for storing the cartridges at known locations and for retrieving a desired cartridge from a storage location and inserting the cartridge into a cartridge reading device, such as a tape or disk drive. Generally speaking, such a cartridge handling system may include a cartridge storage system for storing the cartridges at corresponding storage locations and a cartridge engaging assembly for retrieving a desired cartridge from its corresponding storage location, transporting the cartridge to a cartridge reading device, such as a disk or tape drive, and inserting the cartridge into the drive. The cartridge engaging assembly may also remove a cartridge from a drive, move the cartridge into alignment with its storage location, and return the cartridge to its storage location.

Various features and components of cartridge handling systems and cartridge engaging assemblies are disclosed in U.S. Pat. Nos. 4,944,082 for METHOD OF PROVIDING A SHEET METAL HOUSING WITH PRECISELY POSITIONED MOUNTING REFERENCES of Jones et al.; 4,998,232 for OPTICAL DISK HANDLING APPARATUS WITH FLIP LATCH of Methlie et al.; 5,014,255 for OPTICAL DISK CARTRIDGE HANDLING APPARATUS WITH PASSIVE CARTRIDGE ENGAGEMENT ASSEMBLY of Wanger, et al.; 5,010,536 for CARTRIDGE HANDLING SYSTEM of Wanger et al.; 5,043,962 for CARTRIDGE HANDLING SYSTEM of Wanger, et al.; 5,062,093 for OPTICAL DISK INSERTION APPARATUS of Christie, et al.; 5,101,387 for LATERAL DISPLACEMENT CONTROL ASSEMBLY FOR AN OPTICAL DISK HANDLING SYSTEM of Wanger, et al.; 5,184,336 for LATERAL DISPLACEMENT CONTROL ASSEMBLY FOR AN OPTICAL DISK HANDLING SYSTEM of Wanger, et al.; 5,596,556 for LINEAR DISPLACEMENT AND SUPPORT APPARATUS FOR USE IN A CARTRIDGE HANDLING SYSTEM of Luffel, et al.; and 08/558,949 filed Oct. 12, 1993 for CARTRIDGE HANDLING SYSTEM WITH DUAL CARTRIDGE ENGAGING ASSEMBLY, which are each hereby specifically incorporated by reference for all that is disclosed therein.

Many cartridge handling systems of the type described above store the cartridges in a two-dimensional array consisting of one or more vertical columns and horizontal rows. One or more disk or tape drives for the cartridges may be located anywhere in the array, but are usually positioned at the ends of the columns or rows. In any event, such a cartridge handling system will include apparatus for moving the cartridge engaging assembly throughout the array, so that the stored cartridges can be accessed and transported to and from the appropriate disk or tape drive.

While cartridge handling systems of the type described above provide a convenient means for automatically accessing a large number of cartridges, they are not without their problems. For example, a key factor in the successful operation of such a cartridge handling system is the ability to quickly and accurately move the cartridge engaging assembly throughout the array, engage a desired cartridge, and move it quickly to the appropriate cartridge reading device. Generally speaking, the apparatus for so moving the cartridge engaging assembly tends to be complex, and may include a large number of drive motors and position sensors to accomplish the desired functions. As with any mechanical system, however, such increased complexity often means decreased reliability. Therefore, it is desirable to minimize the number of components in such a system, but without sacrificing other performance parameters, such as speed and accuracy.

Another problem with such cartridge handling systems relates to the support and accurate positioning of the cartridge engaging assembly with respect to the cartridges stored in the array. For example, many cartridge engaging assemblies are cantilevered on a leadscrew, which when turned, moves the cartridge assembly across the array of cartridges. Unfortunately, such a cantilevered mounting arrangement tends to allow excessive transverse or rotational movement of the cartridge engaging assembly, which reduces positional accuracy. One way to increase the stability of the cartridge engaging assembly, thus positional accuracy, is to use rigid guide rails or tracks to provide additional support to the cartridge engaging assembly. Disadvantageously, many of the guide rail or track assemblies in use today are precision machined items, which adds to the overall cost of the cartridge handling system. Further, such guide rail assemblies are often difficult and time consuming to align. Worse yet, the guide rail assembly may be knocked out of alignment during subsequent shipping or movement of the cartridge handling device, thus requiring re-alignment and re-calibration before the device can be placed in operation.

Another problem relating to many cartridge handling systems is access speed, and efforts are constantly being made to minimize the mass of each component of the system, including the linear displacement and support apparatus for the cartridge engaging assembly, which tends to increase the speed at which the cartridge engaging assembly may be moved among the columns and rows of cartridges. Unfortunately, it is usually more difficult to achieve the desired degree of positional accuracy with a lighter weight system, and designers are constantly trying to find the optimum balance between light weight and positional accuracy. It is also desirable to minimize the volume requirements of the linear displacement and support apparatus so that it may be mounted in a relatively small space within the cartridge handling system.

Consequently, there remains a need for a cartridge handling system having increased positional accuracy to reduce errors due to misalignment of the cartridge engaging assembly. Such increased positional accuracy should be achieved with a minimum number of components to increase reliability, yet not require the use of expensive machined guide rails or tracks, which adds cost. Additional advantages could be realized by reducing the amount of time required to align and calibrate the assembly during production, and by reducing the likelihood of subsequent misalignment, such as may occur during shipping. Ideally, the above advantages should be accomplished without increasing the mass of the moving components, which tends to adversely affect access speed.

SUMMARY OF THE INVENTION

The structure, guidance, and drive assembly for translation of a robotic picker assembly may comprise a support frame having a front end, a rear end, and two opposed sides. The front and rear ends of the support frame are positioned in parallel, spaced-apart relation to a lateral axis, while the two opposed sides are positioned in parallel, spaced-apart relation to a longitudinal axis, the lateral and longitudinal axes defining a horizontal reference plane. The support frame includes a first elongate bearing surface that is located at about the front end of the support frame. The first elongate bearing surface extends between the two opposed sides of the support frame so that the first elongate bearing surface extends in a direction that is substantially parallel to the lateral axis and lies in a first bearing plane that is substantially parallel to the horizontal reference plane. The support frame also includes a second elongate bearing surface that is located at about the rear end of the support frame. The second elongate bearing surface also extends between the two opposed sides of the support frame and also extends in a direction that is substantially parallel to the lateral axis and lies in a second bearing plane that is substantially parallel to the horizontal reference plane. The second bearing surface plane is non-coplanar with the first bearing surface plane. A three point contact primary bearing system mounted to the robotic picker assembly is adapted to engage the first and second elongate bearing surfaces and allows the robotic picker assembly to be displaced within the support frame in a direction generally parallel to the lateral axis and along the horizontal reference plane. An actuator connected to the robotic picker assembly moves the robotic picker assembly to predetermined points along the lateral axis in response to commands from a control system.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
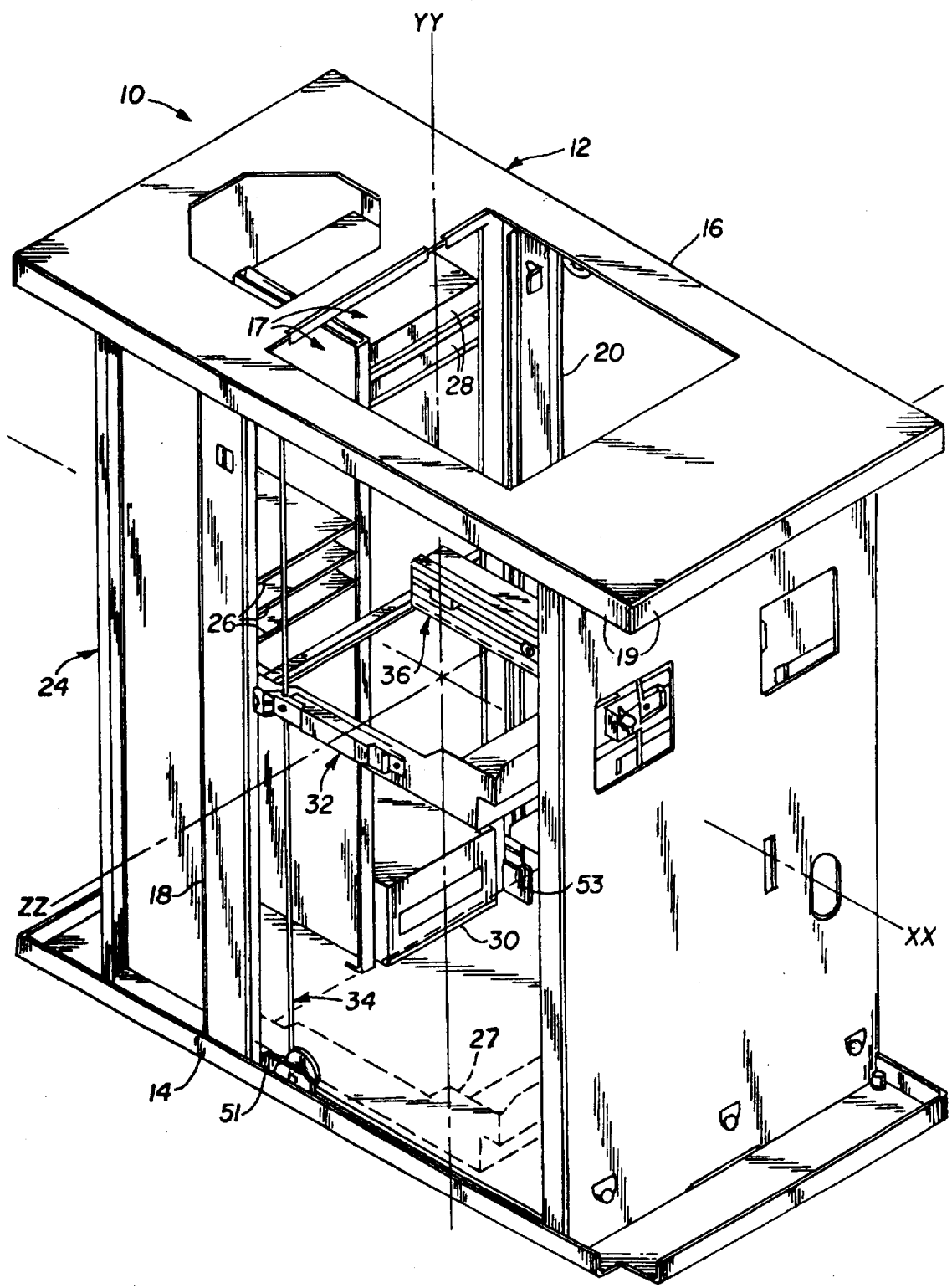
FIG. 1 is a perspective view of a cartridge handling system having the structure, guidance, and drive assembly for the translation of a robotic picker assembly according to the present invention.

A structure, guidance, and drive assembly 10 for the translation of a robotic picker assembly 36 is shown in FIG. 1 as it could be used in a cartridge handling system 12 for storing and accessing a plurality of cartridges 28 stored in a plurality of vertical columns 17. The cartridge handling system 12 may comprise a cartridge storage rack assembly 24 that is mounted to a base plate 14 and a top cover 16. The cartridge storage rack assembly 24 contains a plurality of cartridge storage locations or slots 26 arranged in two columns 17 that are adapted to slidably receive the cartridges 28. The cartridge storage rack assembly may also include first and second travel stops 51, 53 for providing an initial or reference position 27 (shown in phantom in FIG. 1) for a frame assembly 32, as will be described in greater detail below. Finally, the cartridge storage rack assembly 24 may also include space for one or more cartridge readers 30 capable of reading data from, or writing data to, the storage media contained within the cartridges 28.

The frame assembly 32 may be slidably mounted to first and second guide rails 18 and 20 so that it can be moved up and down (i.e., along axis YY) by a suitable actuator assembly 34. Frame assembly 32 may be adapted to receive a robotic picker assembly 36 of the type disclosed in U.S. patent application Ser. No. 08/558,949 for CARTRIDGE HANDLING SYSTEM WITH DUAL CARTRIDGE ENGAGING ASSEMBLY, which was incorporated by reference above, although nearly any type of robotic picker assembly known in the art could also be used without departing from the scope of the present invention. The particular robotic picker assembly 36 identified above is slidably mounted within frame assembly 32, so that it can be moved back and forth along a lateral axis (i.e., along the ZZ direction) to access cartridges 28 stored in either of the vertical columns 17. Consequently, the range of travel of the structure, guidance, and drive assembly 10 is such that the robotic picker assembly 36 can access all of the cartridges 28 stored within the cartridge storage rack 24, as well as the cartridge reader 30.

Figure 2:
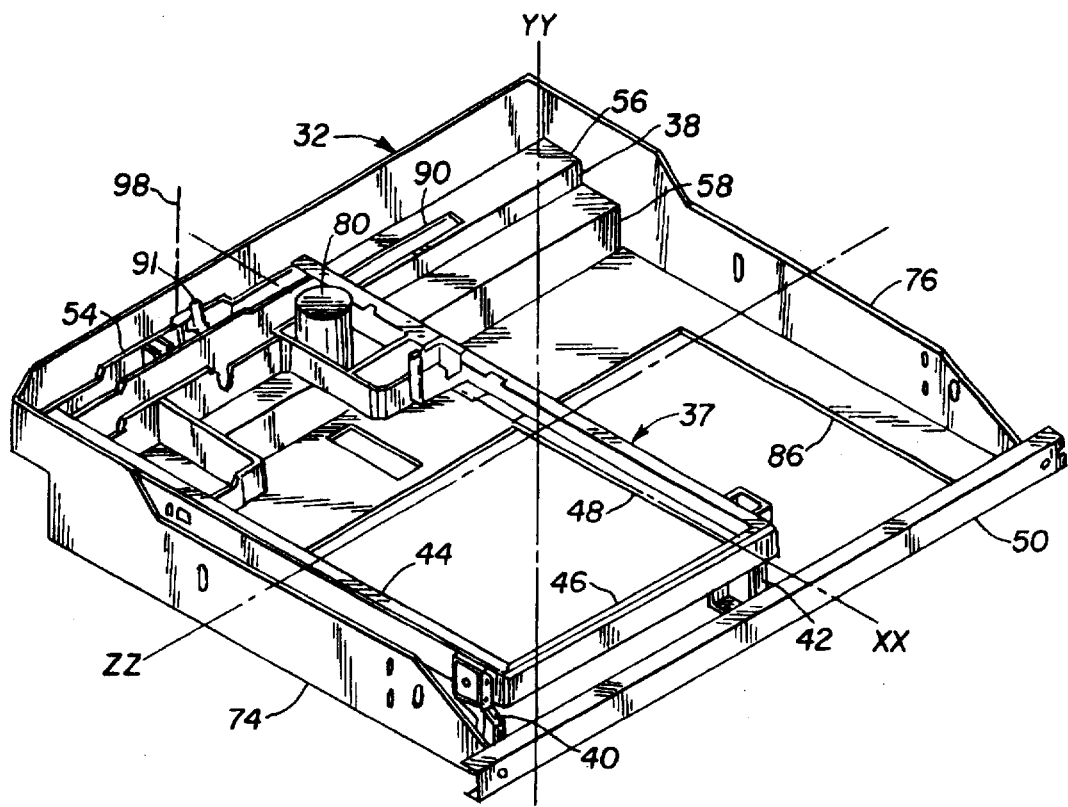
FIG. 2 is a perspective view of the structure, guidance, and drive assembly showing the robotic picker assembly frame at a first end position.

Referring now to FIG. 2, structure, guidance, and drive assembly 10 may include a picker frame assembly 37 adapted to receive a suitable robotic picker assembly 36 (not shown in FIG. 2 for clarity). The picker frame 37 is mounted within the frame assembly 32 by a primary three point contact bearing system that allows the picker frame 36 to be linearly translated in the ZZ (i.e., lateral) direction. As will be discussed in greater detail below, the primary three point contact bearing system may comprise a first roller assembly 40 mounted to a first side member 44 of picker frame assembly 37 and a second roller assembly 42 mounted to a second side member 48. The first and second roller assemblies 40 and 42 are mounted to the respective side members 44 and 48 near the front member 46 so that the respective rollers 41 and 43 engage a front guide rail 50 attached to the frame assembly 32. A third roller 52 is attached to the rear frame member 36 of picker frame 36 and engages a horizontal bearing surface 56, as best seen in FIG. 6.

Figure 3:
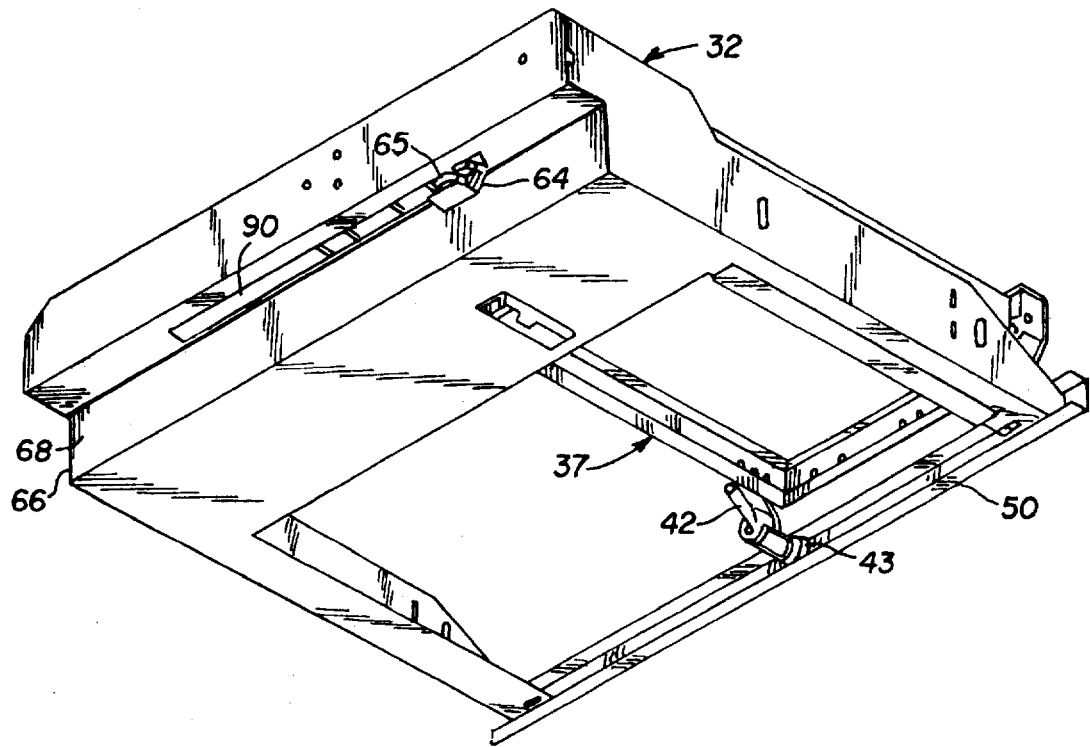
FIG. 3 is a perspective view of the underside of the structure, guidance, and drive assembly more clearly showing the engagement of the sixth roller assembly with the outer surface of the vertical bearing member.
Figure 5:
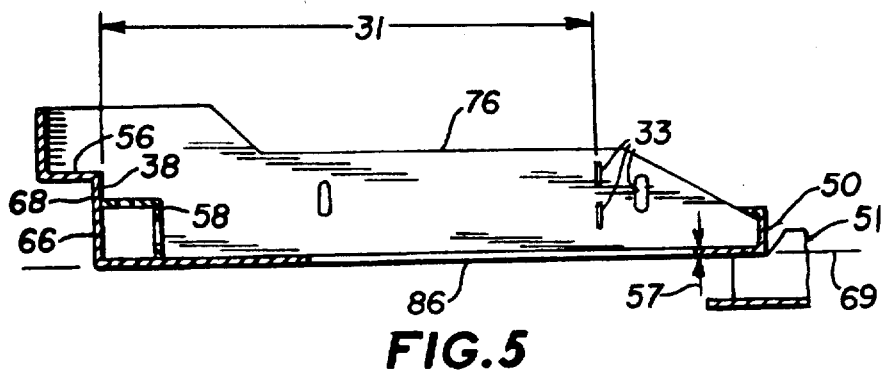
FIG. 5 is a cross-section view in elevation of the frame assembly taken along the line 5—5 of FIG. 4.
Figure 6:
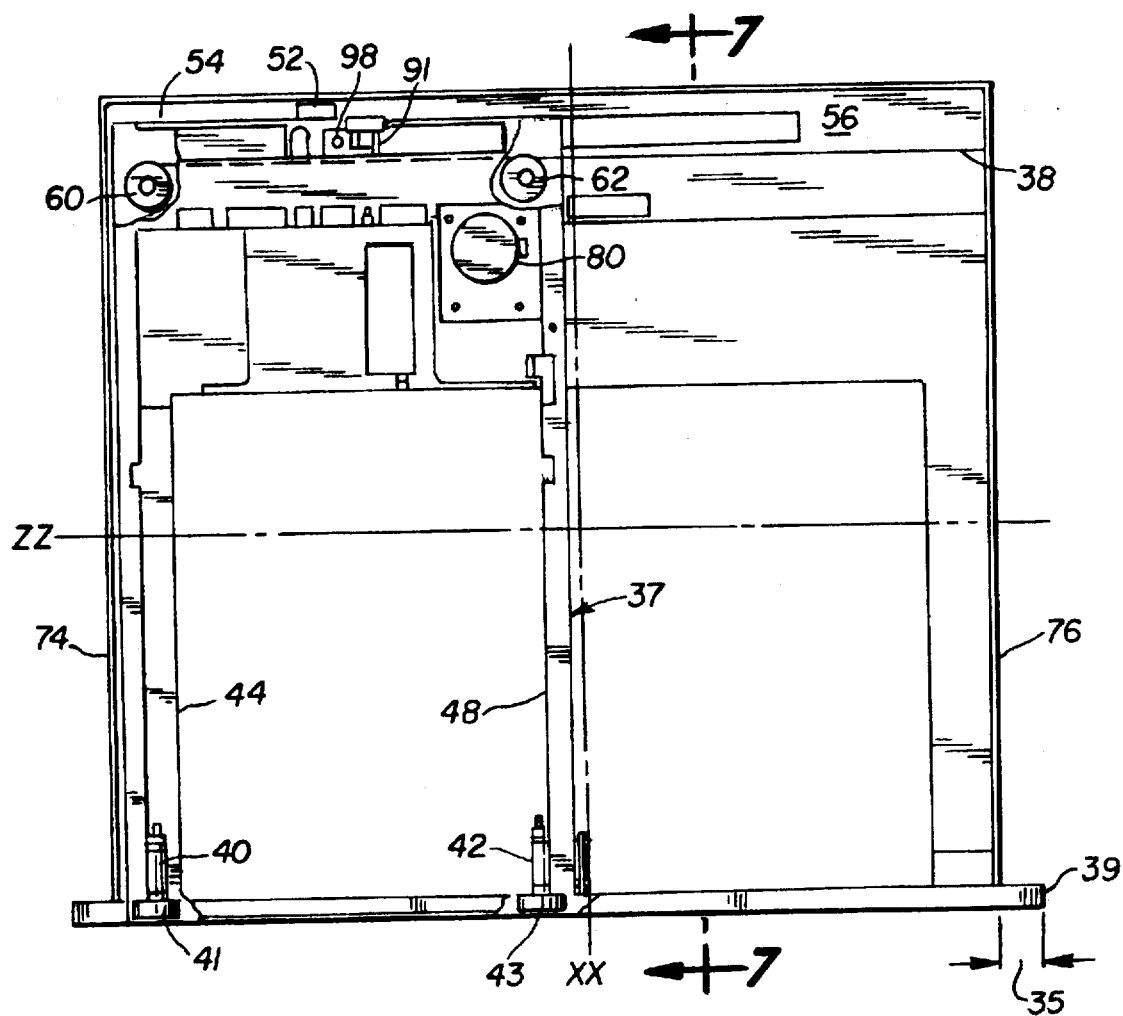
FIG. 6 is a plan view of the structure, guidance, and drive assembly showing the position of the first, second, third, fourth, and fifth roller assemblies.

Still referring to FIG. 6, a secondary three point contact bearing system is used to prevent the picker frame 36 from moving in the XX (i.e., longitudinal) direction. More specifically, the secondary three point contact bearing system comprises a fourth roller 60 attached to the rear frame member 54 near the first side member 44 and a fifth roller 62 attached to the rear frame member 54 near the second side member 48. The fourth and fifth rollers 60 and 62 engage the inner side 38 of vertical bearing member 66 (FIGS. 5 and 6). A sixth roller assembly 64 is mounted to the rear frame member 54, so that roller 65 engages the outer side 68 of vertical bearing member 66, as best seen in FIG. 3. The sixth roller assembly 64 is spring biased against the outer side 68 of vertical bearing member 66 to keep the fourth and fifth rollers 60 and 62 firmly engaged with the inner side of bearing surface 38, as will be explained in greater detail below.

Figure 7:
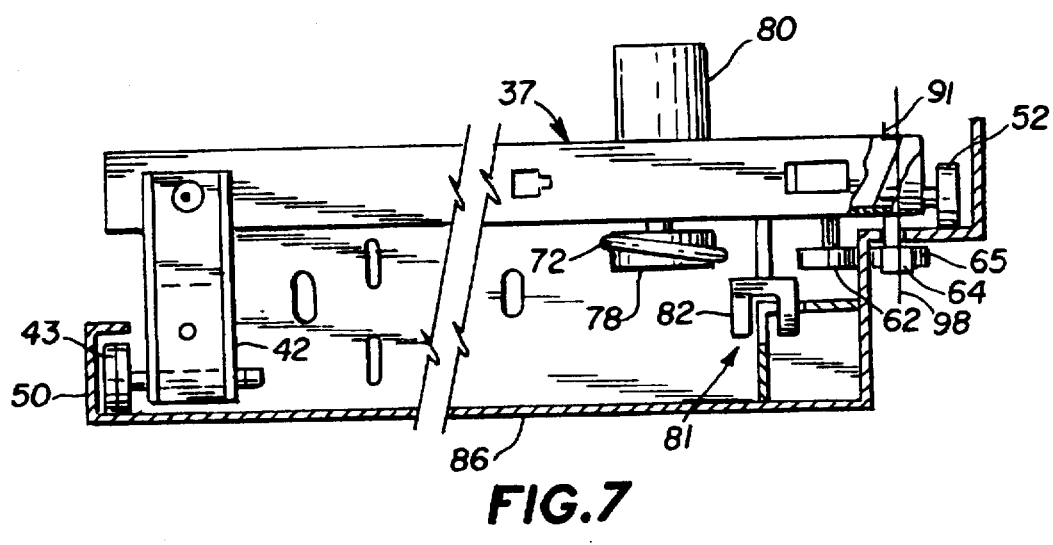
FIG. 7 is a cross-section view in elevation of the structure, guidance, and drive assembly taken along the line 7—7 of FIG. 6 more clearly showing the sixth roller assembly and the spring biasing member.
Figure 8:
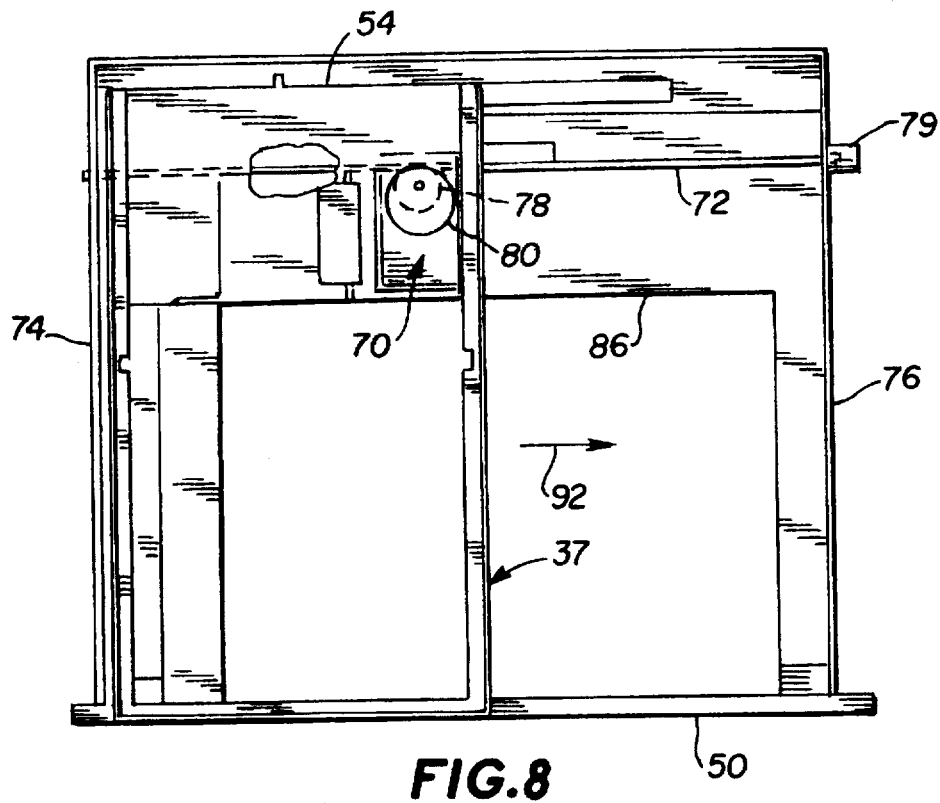
FIG. 8 is a plan view of the structure, guidance, and drive assembly showing the motor and drive cable assembly.
Figure 9:
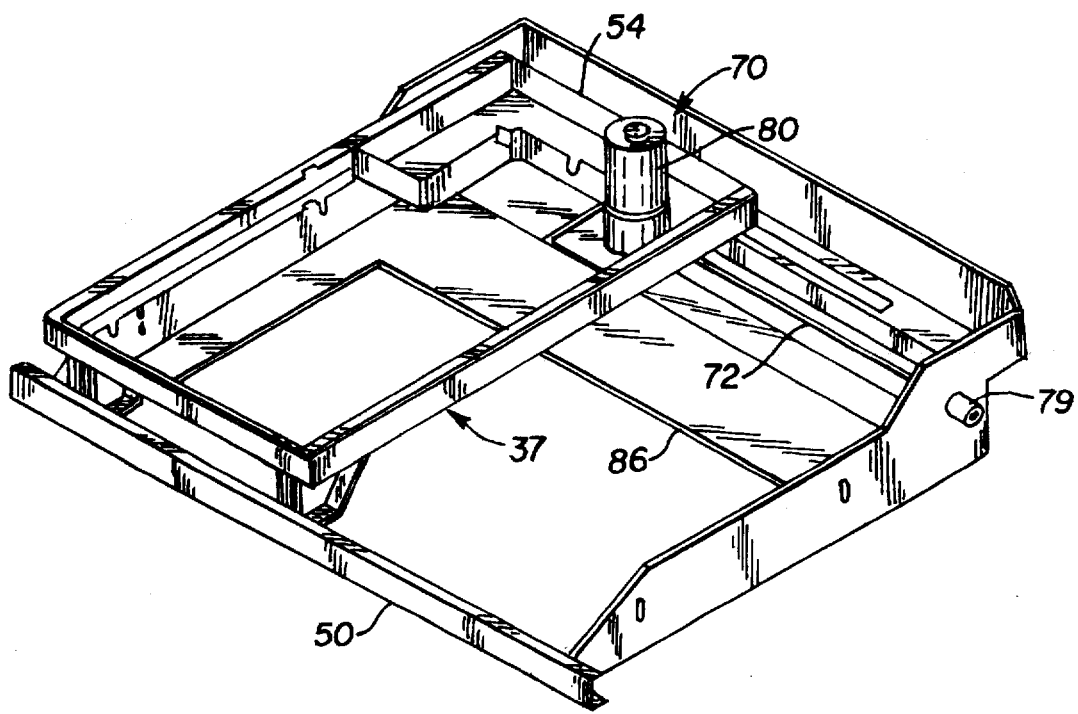
FIG. 9 is a perspective view of the structure, guidance, and drive assembly and motor and drive cable assembly.

The picker frame assembly 37 may be rolled back and forth within frame assembly 32 along the ZZ, or lateral, direction by a motor and drive cable assembly 70, as best seen in FIGS. 8 and 9. Briefly, motor and drive cable assembly 70 comprises a wire rope or drive cable 72 mounted to the first frame side member 74 and the second frame side member 76 so that it is stretched therebetween. A tensioning device 79 keeps drive cable 72 at a predetermined tension. Drive cable 72 is wrapped around a capstan 78 connected to a suitable drive motor 80 mounted to the rear frame member 54 of picker frame assembly 37. When drive motor 80 is actuated by a suitable control system (not shown), the engagement of the drive cable 72 with the capstan 78 will cause the picker frame assembly 37 to be rolled from one end of the frame assembly 32 to the other end, i.e., along the ZZ (lateral) direction. The picker frame assembly 37 may also include a position encoder 81 (FIG. 7) for determining the position of the picker frame 37 within the frame 32. In one preferred embodiment, the position encoder 81 includes an optical sensor 82 for sensing an aperture 84 (FIG. 4) and end point indexing slots 83 and 85 in torsion box 58, as will be described in greater detail below.

A significant advantage of the cartridge engaging assembly 10 according to the present invention is that the primary three point contact bearing system rollingly supports the robotic picker assembly 36 within frame assembly 32 on a precisely defined horizontal reference plane. The secondary three point contact bearing system prevents the robotic picker assembly 36 from moving in the XX (i.e., longitudinal) direction. Therefore, the combination of the primary and secondary three point contact bearing systems allow the picker assembly 36 to be smoothly translated along the ZZ (i.e., lateral) direction and along a precisely defined horizontal reference plane, thus resulting in increased positional accuracy.

Another advantage of the present invention is that the increased positional accuracy has been achieved without the need to resort to expensive, precision machined components. In fact, most of the components may be formed from relatively light gauge sheet metal, thus reducing the overall weight of the moving parts as well as reducing production costs. The structure also allows for much easier alignment and calibration during production, and is less likely to become mis-aligned during subsequent shipping or handling.

Still another advantage of the present invention is that motor and drive cable assembly 70 allow the robotic picker assembly to be moved back and forth within frame assembly 32 while the frame assembly 32 is itself being translated in the vertical direction. This ability to translate the robotic picker assembly "on the fly" decreases cartridge access time.

Figure 4:
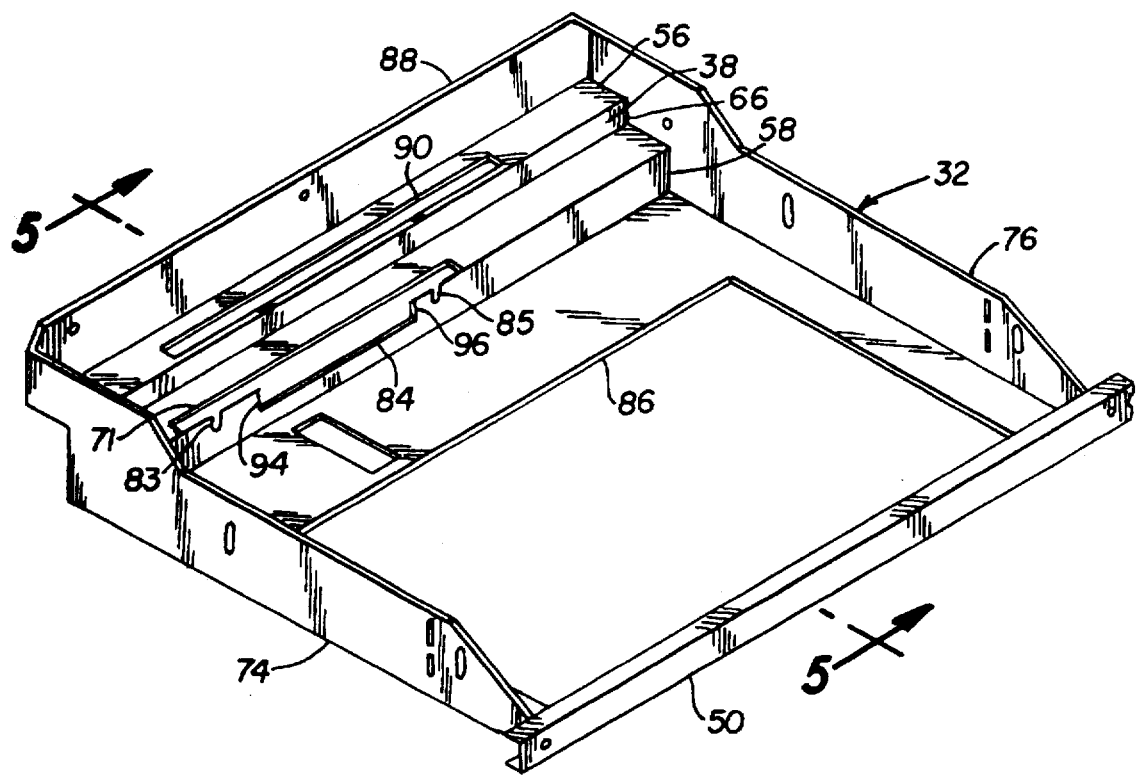
FIG. 4 is a perspective view of the frame assembly showing the details of the position indexing aperture and slots of the position encoder assembly.

The details of the frame assembly 32 are best seen by referring to FIGS. 4 and 5 simultaneously with occasional reference to FIGS. 2 and 3. In one preferred embodiment, the frame assembly 32 may be made from relatively light gauge (e.g., 18 gauge) sheet metal and fabricated according to the teachings of U.S. Pat. No. 4,944,082 for METHOD OF PROVIDING A SHEET METAL HOUSING WITH PRECISELY POSITIONED MOUNTING REFERENCES, which was incorporated by reference above. Accordingly, it will be possible to fabricate frame assembly 32 to close tolerances, thus further increasing positional accuracy. For example, a critical dimension of one preferred embodiment of the frame assembly 32 may be the spacing 31 between the vertical bearing member 66 and the attachment holes 33 for the bearing (not shown) for engaging the second guide rail 20 (FIG. 1). Close tolerances for this spacing 31 will help ensure accurate positioning of the robotic picker assembly 36 along the XX axis. Another critical dimension is the spacing 35 between the end 39 of the front guide rail 50 and the frame side 76. See FIG. 6. Again, close tolerances for the spacing 35 helps to ensure that the end points of the picker frame assembly 37 will be precisely defined with respect to the end 39 of front guide rail 50, which end 39 engages guide rail 18. The resulting arrangement provides for more accurate positioning along the ZZ axis.

Referring back to FIGS. 4 and 5, frame assembly 32 may comprise a plate-like base member 86 that defines a horizontal reference plane 69. Base member 86 includes a vertical bearing member 66 perpendicular to horizontal reference plane 69, a horizontal bearing surface portion 56 parallel to horizontal reference plane 69, and a vertical end flange 88, as best seen in FIGS. 4 and 5. Horizontal bearing surface 56 includes a clearance slot 90 which allows the sixth roller assembly 64 of the secondary three point contact bearing system to engage the outer bearing surface 68 of vertical bearing member 66.

Frame assembly 32 also includes a first side member 74 and a second side member 76 that may be integrally formed from the base member 86, or may be separate components. A front guide rail 50 having a C-shaped cross-section is attached to the base member 86 and is adapted to engage the first and second roller assemblies 40, 42 of the primary three point contact bearing system. For increased positional accuracy, the front guide rail 50 may be integrally formed from base member 86, although it could also comprise a separate piece.

A torsion box 58 having an L-shaped cross-section may be attached to the vertical bearing member 66 and the base member 86 by any convenient means, such as by welding, to increase the torsional rigidity of the frame assembly 32.

Torsion box 58 also includes a position indexing system comprising an encoder aperture 84 having a first end 94 and a second end 96, as well as a pair of end point indexing slots 83, 85, which allow the optical sensor 82 to assist in positioning the picker frame assembly 37 at the respective end travel points. Torsion box 58 also includes a clearance slot 71 for the optical sensor 82, as best seen in FIG. 7. Torsion box 58 may also be manufactured from a single piece of sheet metal.

The robotic picker assembly 36 (FIG. 1) may be mounted in suitable picker frame assembly 37 that is slidably mounted within frame 32. The details of the picker frame assembly 37 are best seen by referring to FIGS. 2 and 3 simultaneously with occasional reference to FIGS. 6, 7, 8, and 9. As was mentioned above, picker frame assembly 37 is adapted to receive the particular cartridge picker assembly 36 (FIG. 1) that will be used for releasably engaging the cartridges 28. While the specific details of the picker frame assembly 37 may differ depending on the particular robotic picker assembly used, it will generally include a first side member 44 and a second side member 48 separated at one end by a front member 46 and at the other end by a rear frame member 54. The first roller assembly 40 and the second roller assembly 42 are mounted to the respective first and second side members 44, 48, near the front member 46, so that the respective rollers 41 and 43 engage the C-shaped guide rail 50 of frame assembly 32, as best seen in FIGS. 3 and 7. The third roller 52 is mounted to the rear frame member 54, substantially equidistant between the first and second side members 44, 48, so that it engages horizontal bearing surface 56, as best seen in FIGS. 6 and 7.

As was mentioned above, the first, second, and third roller assemblies 40, 42, and 52 form the three point contact primary bearing system that horizontally positions the picker frame assembly 37 within frame assembly 32 and allows it to be rolled in the ZZ (i.e., lateral) direction. Since only three contact points are used, the picker frame assembly 37 will roll substantially on the horizontal reference plane 69. That is, the first and second roller assemblies 40 and 42 roll along guide channel 50, which is coincident with horizontal reference plane 69, while the third roller 52 rolls along horizontal surface 56 which is substantially parallel to the horizontal reference plane 69. Thus, the entire picker frame assembly 37 will translate along the horizontal reference plane 69.

Vertical positioning accuracy of the robotic picker assembly 36 with respect to the cartridges 28 is enhanced if the frame assembly 32 is used in a cartridge handling system 12 that includes integral travel stops 51 and 53. That is, if the frame assembly 32 is lowered to the initial or home position 27 (FIG. 1) so that the front guide rail 50 is resting on the travel stops 51, 53 (see FIG. 5), then only the thickness 57 of front guide rail 50 will separate the horizontal reference plane 69 from the travel stops 51, 53. Thus, the initial reference position of the robotic picker assembly 36 can be accurately determined.

Further, the first and second roller assemblies 40 and 42, being positioned at the front corners of the picker frame 36, substantially at the intersection of the front member 46 with the first and second side members 44 and 48, maintain the parallel alignment of the front member 46 with the horizontal guide rail 50 throughout the range of travel of the picker frame assembly 37, thus reducing cartridge engaging problems due to misalignment of the robotic picker assembly 36 (FIG. 1) with the cartridges 28.

The picker frame assembly 37 is prevented from moving in XX (i.e., longitudinal) direction by the three point secondary bearing system which engages the inner and outer bearing surfaces 38 and 68 of vertical bearing member 66. See FIGS. 3, 6, and 7. The three point secondary bearing system includes a fourth roller 60 mounted to the first side member 44 of picker frame assembly 36 and a fifth roller 62 mounted to the second side member 48, so that they engage the inner bearing surface 38 of vertical bearing member 66. The sixth roller assembly 64 is mounted to the rear frame member 54, substantially equidistant between the first and second side members 44, 48, so that roller 65 engages the outer bearing surface 68 on the opposite side of vertical bearing member 66 through the clearance slot 90, as best seen in FIGS. 3 and 7. The sixth roller assembly 64 is pivotally mounted to the rear frame member 54 along pivot axis 98 and includes a spring 91 for biasing the sixth roller assembly 64 against bearing surface 68 to keep the fourth and fifth rollers 60 and 62 firmly engaged with inner bearing surface 38.

The picker frame assembly 37 is rolled back and forth within the frame assembly 32 by motor and drive cable assembly 70 as best seen in FIGS. 7, 8, and 9. As was described above, the motor and drive cable assembly 70 comprises a wire rope or drive cable 72 mounted between the first frame side member 74 and the second frame side member 76. A tensioning device 79 mounted to one end of drive cable 72 keeps drive cable 72 at a predetermined tension. The drive cable 72 is wrapped around the capstan 78 of drive motor 80, which itself is mounted to the rear frame member 54. When drive motor 80 is actuated by a suitable control system (not shown), the engagement of the drive cable 72 with the capstan 78 will cause the picker frame assembly 36 to be rolled along the ZZ direction. In one preferred embodiment, drive cable 72 is wrapped only once around capstan 78, which allows the drive cable to slip on the capstan 78 in the event the picker assembly becomes jammed, thus preventing damage to the motor 80 and/or the motor control system (not shown).

Since the capstan 78 attached to drive motor 80 may slip along the drive cable 72 under certain circumstances, a position encoder assembly 81 is used to determine the position of the picker frame assembly 37 with respect to the frame assembly 32. In one preferred embodiment, the position encoder assembly 81 may comprise an optical sensor 82 for detecting the aperture 84 and pair of end point indexing slots 83 and 85 that are integral to torsion box 58, as best seen in FIGS. 4 and 7. Each end point indexing slot 83, 85 is positioned a spaced distance from the respective ends 94, 96 of aperture 84, as best seen in FIG. 4. While a wide variety of control algorithms are well-known in the art that could be used with the encoder 81, one preferred embodiment utilizes an algorithm that functions as follows.

Suppose, for example, that the picker frame assembly 37 is located with respect to the frame assembly 32 as shown in FIG. 8. The picker frame assembly 37 is held against frame side 74 by motor 80, which applies a low level holding torque to capstan 78, which holds the picker frame 37 firmly against frame side 74. So located, the robotic picker assembly 36 will be aligned with the right hand column 17, as shown in FIG. 1, and the optical sensor 82 will be positioned just to the left of end slot 83 (FIG. 4). If it is desired to move the robotic picker assembly 36 to align it with left hand column 17 (FIG. 1), then the motor control assembly (not shown) would actuate motor 80 to apply maximum torque in the reverse direction, which will begin moving the picker frame assembly 37 in the direction of arrow 92 (FIG. 8). Maximum motor torque would continue to be applied until the optical sensor 82 detects the second end 96 of aperture 84 (FIG. 4). At this point, the control system would then reduce the motor torque to slow the picker frame 37 until the optical sensor 82 detects end point indexing slot 85. At this point, the motor control system will apply a small holding voltage to motor 80, which will apply a small holding torque to capstan 78 to move the frame assembly 37 firmly against frame side 76. In this position, the optical sensor 82 will be just to the right of end point indexing slot 85 (FIG. 4). Of course, the picker assembly 36 could be returned back to its original position in essentially the same manner. The combination of the optical sensor 82, slot aperture 84, and the respective end point indexing slots 83 and 85, thus provide a means for determining the position of the picker frame assembly 36 without reference to the motor and drive cable assembly 70.

It is contemplated that the inventive concepts herein described may be variously otherwise embodied and it is intended that the appended claims be construed to include alternative embodiments of the invention except insofar as limited by the prior art.

What is claimed is:

1. Apparatus for linearly displacing a robotic picker assembly along a lateral axis and for supporting the robotic picker assembly at a fixed orientation relative to a horizontal reference plane and at predetermined points along the lateral axis, the robotic picker assembly having a front end, a rear end, and two opposed sides, comprising:

a support frame having a front end, a rear end, and two opposed sides, the front and rear ends being generally parallel to the lateral axis, and the two opposed sides being generally parallel to a longitudinal axis, the lateral and longitudinal axes lying within the horizontal reference plane, said support frame including a first elongate bearing surface located at about the front end of said support frame and extending between the two opposed sides, said first elongate bearing surface extending in a direction that is substantially parallel to the lateral axis and lying in a first bearing surface plane that is substantially parallel to the horizontal reference plane; and a second elongate bearing surface located at about the rear end of said support frame and extending between the two opposed sides, said second elongate bearing surface extending in a direction that is substantially parallel to the lateral axis and lying in a second bearing surface plane that is substantially parallel to the horizontal reference plane, the second bearing surface plane being non-coplanar with said first bearing surface plane;

a three point contact primary bearing assembly mounted to the robotic picker assembly and engaging said first and second elongate bearing surfaces, said three point contact primary bearing assembly allowing the robotic picker assembly to be displaced within said support frame in a direction generally parallel to the lateral axis; and an actuator connected to the robotic picker assembly for linearly translating the robotic picker assembly to predetermined points along the lateral axis.

2. The apparatus of claim 1, further comprising:

a third elongate bearing surface extending between the two opposed sides, said third elongate bearing surface extending in a direction that is substantially parallel to the lateral axis and lying in a third bearing surface plane that is substantially perpendicular to the horizontal reference plane;

a fourth elongate bearing surface extending between the two opposed sides, said fourth elongate bearing surface extending in a direction that is substantially parallel to the lateral axis and lying in a fourth bearing surface plane that is substantially perpendicular to the horizontal reference plane, the third bearing surface plane being non-coplanar with the fourth bearing surface plane; and a three point contact secondary bearing assembly mounted to the robotic picker assembly and engaging said third and fourth elongate bearing surfaces, said three point contact secondary bearing assembly preventing the robotic picker assembly from being displaced in a direction generally parallel to the longitudinal axis.

3. The apparatus of claim 2, wherein said three point contact primary bearing assembly comprises:

a first point contact bearing mounted to the front end of the robotic picker assembly near one of the two opposed sides;

a second point contact bearing mounted to the front end of the robotic picker assembly near the other of the two opposed sides, said first and second point contact bearings engaging said first elongate bearing surface; and a third point contact bearing mounted to the rear end of the robotic picker assembly and engaging said second elongate bearing surface.

4. The apparatus of claim 3, wherein said second elongate bearing surface is elevated with respect to said first elongate bearing surface.

5. The apparatus of claim 4, wherein said three point contact secondary bearing assembly comprises:

a fourth point contact bearing mounted to the rear end of the robotic picker assembly near one of the two opposed sides;

a fifth point contact bearing mounted to the rear end of the robotic picker assembly near the other of the two opposed sides, said fourth and fifth point contact bearings engaging said third elongate bearing surface; and a sixth point contact bearing mounted to the rear end of the robotic picker assembly between said fourth and fifth point contact bearings, said sixth point contact bearing engaging said fourth elongate bearing surface.

6. The apparatus of claim 5, wherein said sixth point contact bearing is biased against.

7. The apparatus of claim 6, further comprising position encoder means connected to the robotic picker assembly for determining a position of the robotic picker assembly along the lateral axis.

8. The apparatus of claim 7, wherein said position encoder means comprises:

position indexing means attached to said support frame for providing a plurality of fixed indexing points; and detector means attached to the robotic picker assembly for detecting the plurality of fixed indexing points.

9. The apparatus of claim 6, wherein said first, second, third, fourth, fifth, and sixth point contact bearings comprise rollers.

10. The apparatus of claim 1, wherein said actuator comprises a drive motor mounted to the robotic picker assembly, said drive motor having an output shaft;

a capstan mounted the output shaft of said motor;

an elongate flexible tension member having a first end and a second end, the first end of said elongate flexible tension member being attached to one of the two opposed sides of said support frame, the second end of said elongate flexible tension member being attached to the other of the two opposed sides of said support frame, said elongate flexible tension member also being wrapped at least once around said capstan so that said elongate flexible tension member is in frictional engagement with said capstan.

11. The apparatus of claim 10, wherein said elongate flexible tension member comprises a wire rope.

12. The apparatus of claim 11, further comprising a tensioner member connected to one end of the wire rope, wherein said tensioner member maintains the wire rope at a predetermined tension.

13. Apparatus for linearly displacing a robotic picker assembly along a lateral axis and for supporting the robotic picker assembly at a fixed orientation relative to a horizontal reference plane and at predetermined points along the lateral axis, the robotic picker assembly having a front end, a rear end, and two opposed sides, comprising:

a support frame having a front end, a rear end, and two opposed sides, the front and rear ends being generally parallel to the lateral axis, and the two opposed sides being generally parallel to a longitudinal axis, the lateral and longitudinal axes lying within the horizontal reference plane;

a first point contact bearing mounted to the front end of the robotic picker assembly near one of the two opposed sides;

a second point contact bearing mounted to the front end of the robotic picker assembly near the other of the two opposed sides, said first and second point contact bearings engaging a front end horizontal bearing surface on said support frame, the front end horizontal bearing surface being contained within the horizontal reference plane;

a third point contact bearing mounted to the rear end of the robotic picker assembly and engaging a rear end horizontal bearing surface on said support frame, the rear end horizontal surface being substantially parallel to the horizontal reference plane and elevated with respect to the horizontal reference plane;

a fourth point contact bearing mounted to the rear end of the robotic picker assembly near one of the two opposed sides;

a fifth point contact bearing mounted to the rear end of the robotic picker assembly near the other of the two opposed sides, said fourth and fifth point contact bearings engaging a first side of a vertical bearing surface on said support frame, the vertical bearing surface being perpendicular to the horizontal reference plane;

a sixth point contact bearing mounted to the rear end of the robotic picker assembly between said fourth and fifth point contact bearings, said sixth point contact bearing engaging a second side of the vertical bearing surface, the second side of the vertical bearing surface being opposed to the first side, said sixth point contact bearing being biased against the second side of the vertical bearing surface;

actuating means connected to the robotic picker assembly for linearly translating the robotic picker assembly to predetermined points along the lateral axis;

position encoder means connected to the robotic picker assembly for determining a position of the robotic picker assembly along the lateral axis, said position encoder means including:

position indexing means attached to said support frame for providing a plurality of fixed indexing points, wherein said position indexing means comprises an aperture having a first end and a second end and a first end point indexing slot positioned a spaced distance from the first end of said aperture, and a second end point indexing slot positioned a spaced distance from the second end of said aperture; and detector means attached to the robotic picker assembly for detecting the plurality of fixed indexing points.

14. The apparatus of claim 13, wherein said detector means comprises an optical sensor.

15. A cartridge engaging assembly, comprising:

a support frame having a front, a rear, and two opposed sides, said support frame including a base plate that defines a horizontal reference plane, the front and rear sides being generally parallel to a lateral axis, and the two opposed sides being generally parallel to a longitudinal axis, said support frame including a first elongate bearing surface located at about the front end of said support frame and extending between the two opposed sides, said first elongate bearing surface extending in a direction that is substantially parallel to the lateral axis and lying in a first bearing surface plane that is substantially parallel to the horizontal reference plane;

a second elongate bearing surface located at about the rear end of said support frame and extending between the two opposed sides, said second elongate bearing surface extending in a direction that is substantially parallel to the lateral axis and lying in a second bearing surface plane that is substantially parallel to the horizontal reference plane, the second bearing surface plane being non-coplanar with said first bearing surface plane;

a third elongate bearing surface extending between the two opposed sides, said third elongate bearing surface extending in a direction that is substantially parallel to the lateral axis and lying in a third bearing surface plane that is substantially perpendicular to the horizontal reference plane; and a fourth elongate bearing surface extending between the two opposed sides, said fourth elongate bearing surface extending in a direction that is substantially parallel to the lateral axis and lying in a fourth bearing surface plane that is substantially perpendicular to the horizontal reference plane, the third bearing surface plane being non-coplanar with the fourth bearing surface plane; a robotic picker assembly having a front, a rear, and two opposed sides;

a first point contact bearing mounted to the front of said robotic picker assembly near one of the two opposed sides, said first point contact bearing engaging said first elongate bearing surface;

a second point contact bearing mounted to the front of said robotic picker assembly near the other of the two opposed sides, said second point contact bearing engaging said first elongate bearing surface;

a third point contact bearing mounted to the rear of said robotic picker assembly, said third point contact bearing engaging said second elongate bearing surface;

a fourth point contact bearing mounted to the rear of said robotic picker assembly near one of the two opposed sides, said fourth point contact bearing engaging said third elongate bearing surface;

a fifth point contact bearing mounted to the rear of said robotic picker assembly near the other of the two opposed sides, said fifth point contact bearing engaging said third elongate bearing surface;

a sixth point contact bearing mounted to the rear of said robotic picker assembly between said fourth and fifth point contact bearings, said sixth point contact bearing engaging said fourth elongate bearing surface; and an actuator connected to the robotic picker assembly for linearly translating the robotic picker assembly to predetermined points along the lateral axis.

* * * * *

UNITED STATES PATENT AND TRADEMARK OFFICE
CERTIFICATE OF CORRECTION

PATENT NO. : 5,730,031
DATED : March 24, 1998
INVENTOR(S) : Paul et al.

Page 1 of 1

It is certified that error appears in the above-identified patent and that said Letters Patent is hereby corrected as shown below:

<u>Column 10,</u>
Line 47: after "against" insert " -- said fourth elongate bearing surface"
       (USPTO's error)

Signed and Sealed this

Eighteenth Day of September, 2001

*Attest:*

NICHOLAS P. GODICI
*Attesting Officer*     *Acting Director of the United States Patent and Trademark Office*